4 Sheets—Sheet 1.

H. WATKEYS.

Throttle-Valve for Locomotive and other Engines.

No. 9,100. Reissued Feb. 24, 1880.

WITNESSES:

Wm. C. Raymond.

E. Laass

INVENTOR:

Henry Watkeys per Dell, Laass & Hey

Attorneys

H. WATKEYS.

Throttle-Valve for Locomotive and other Engines.

No. 9,100. Reissued Feb. 24, 1880.

WITNESSES:

Wm. R. Raymond

E. Laass

INVENTOR:

Henry Watkeys per Hull, Laass & Hey attorneys

H. WATKEYS.

Throttle-Valve for Locomotive and other Engines.

No. 9,100. Reissued Feb. 24, 1880.

WITNESSES:

Wm. C. Raymond.

E. Laass

INVENTOR:

Henry Watkeys per Dwell, Laass & Hey

Attorneys

H. WATKEYS.

Throttle-Valve for Locomotive and other Engines.

No. 9,100. Reissued Feb. 24, 1880.

WITNESSES:

Wm. L. Raymond.

E. Laass

INVENTOR:

Henry Watkeys per Duell, Laass & Hey attorneys

UNITED STATES PATENT OFFICE.

HENRY WATKEYS, OF SYRACUSE, NEW YORK.

THROTTLE-VALVE FOR LOCOMOTIVE AND OTHER ENGINES.

SPECIFICATION forming part of Reissued Letters Patent No. 9,100, dated February 24, 1880.

Original No. 139,694, dated June 10, 1873. Application for reissue filed January 6, 1880.

*To all whom it may concern:*

Be it known that I, HENRY WATKEYS, of the city of Syracuse, in the State of New York, have invented new and useful Improvements in Throttle-Valves for Locomotive and other Engines, of which the following, taken in connection with the accompanying drawings, is a full, clear, and exact description.

This invention relates to that class of throttle-valves which have a primarily-acting small valve admitting steam into the cylinder before opening the main valve, thereby relieving the latter of a large amount of steam-pressure, and enabling the engineer to properly and conveniently control the action of same, and to gradually apply the steam to the piston of the cylinder in starting the engine, and thus avoid shocks to the machinery, slipping of traction-wheels, and wear and tear generally incident to the sudden opening of the throttle-valve.

The nature of this invention consists in a novel construction and arrangement of two single-seated puppet-valves of different diameters, the smaller of which is seated on the larger, and the latter seated on the end of the dry-pipe and arranged central with the axis of same, by which improvement the construction of said valve is greatly simplified and cheapened, the repairs or renewal of same facilitated, and its action rendered positive and effective.

The invention also consists in a novel device for rendering the lift of said valve adjustable, all as hereinafter more fully described; and it furthermore consists in a peculiar arrangement of toggle-jointed levers for operating the throttle-valve.

Figure 1:
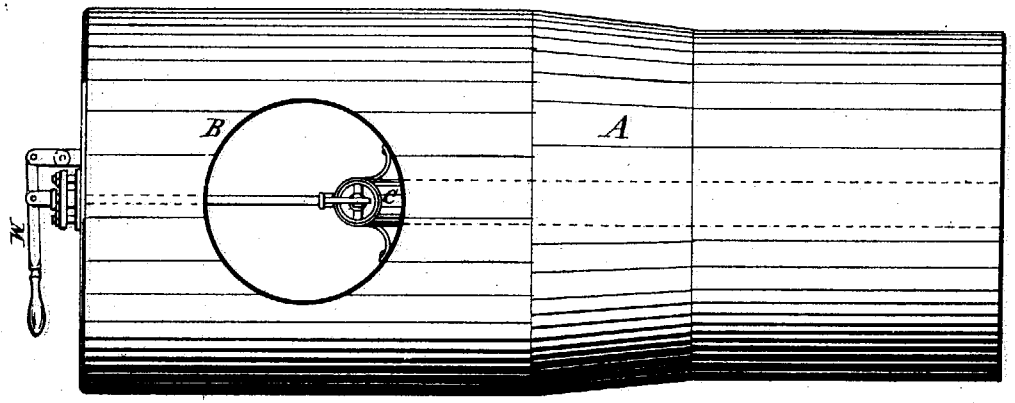
Figure 2:
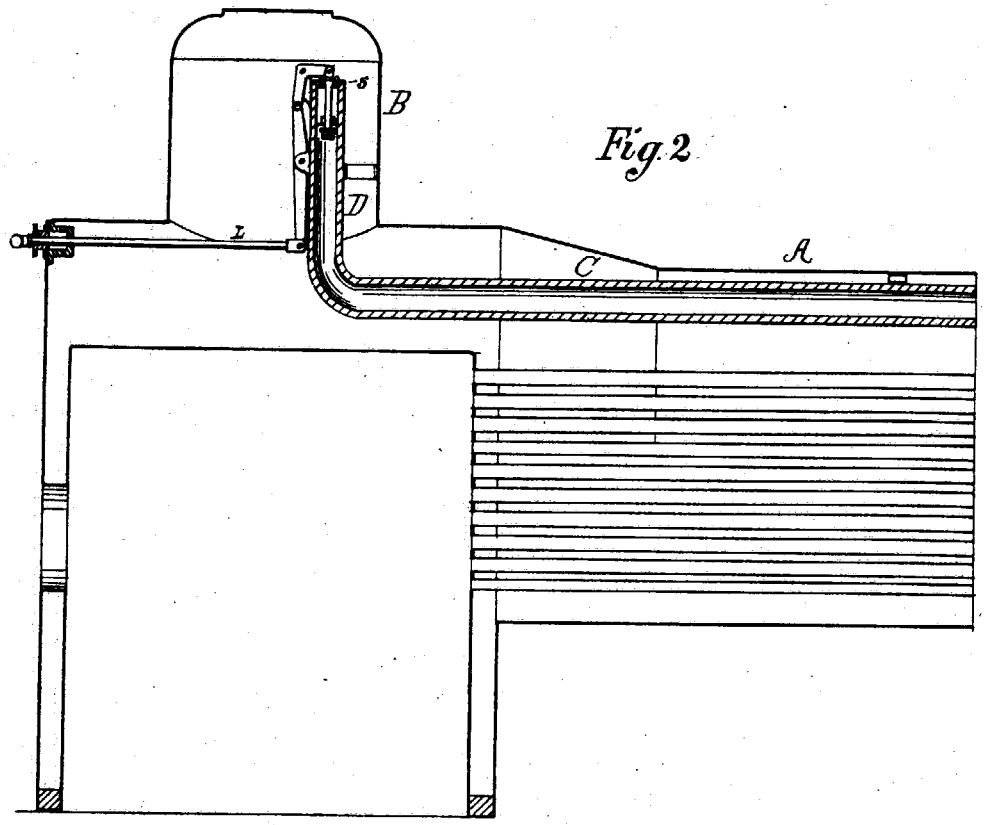
Figure 3:
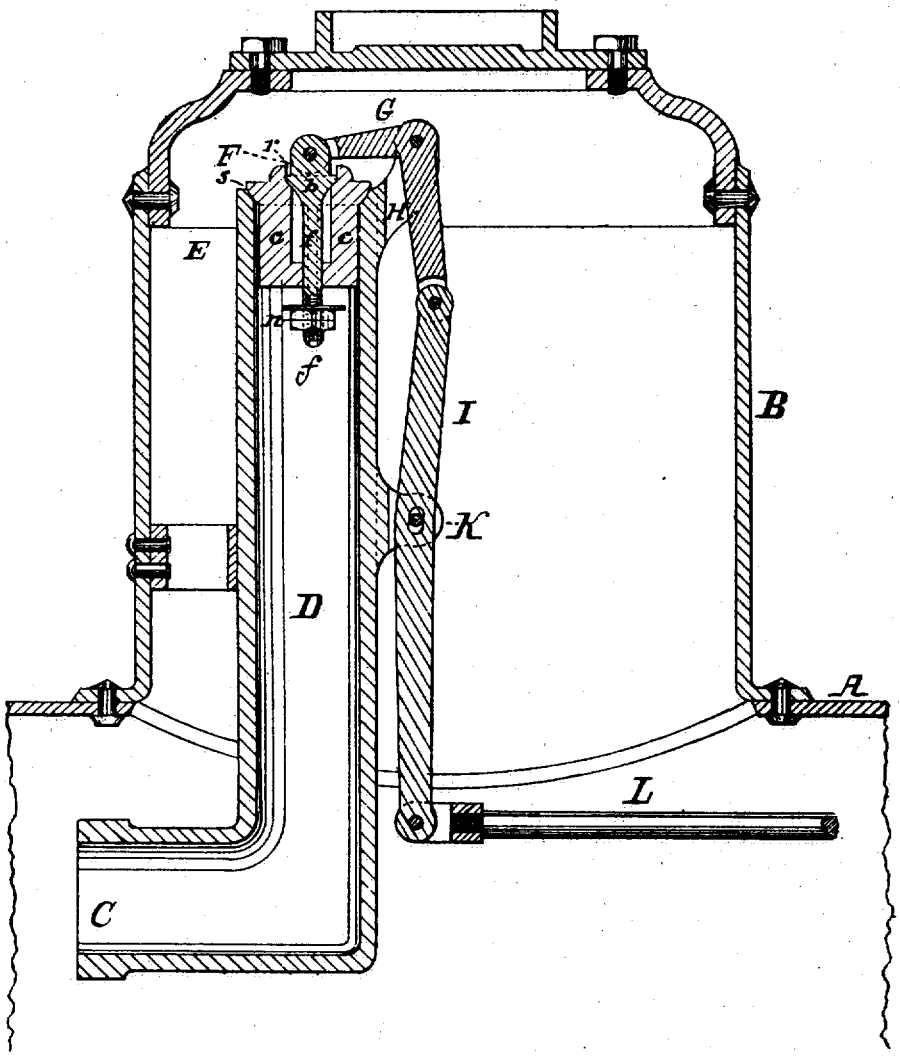
Figure 4:
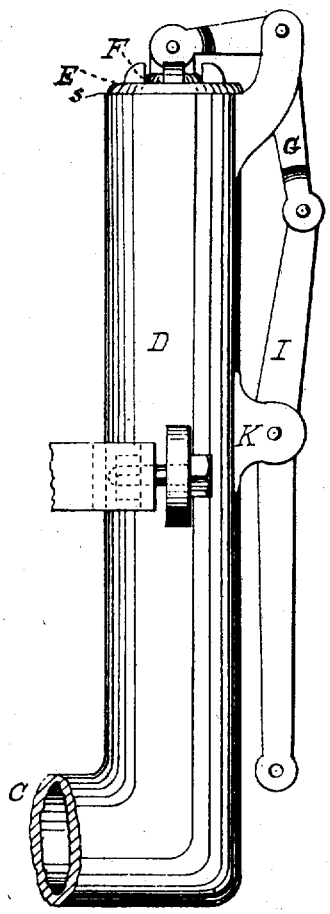
Figure 5:
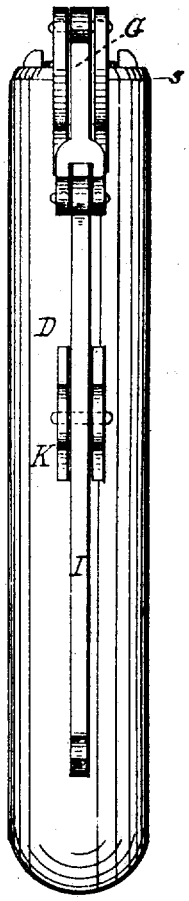
Figure 6:
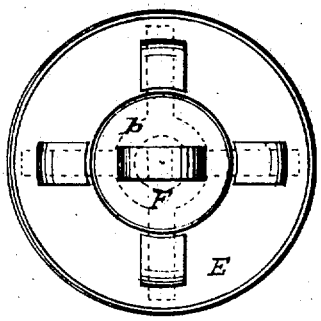
Figure 7:
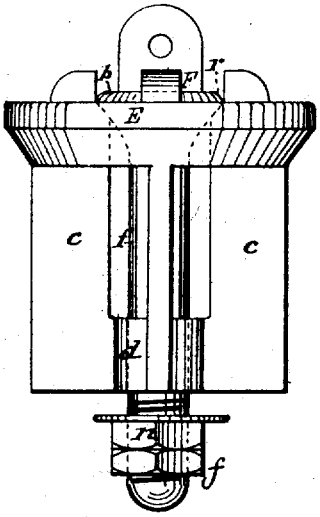

The invention is clearly illustrated in the accompanying drawings, wherein Figure 1 is a plan view of a boiler with the top of the dome removed, showing the invention in position. Fig. 2 is a longitudinal section of same. Fig. 3 is an enlarged vertical section of the steam-dome and the throttle-valve in position. Figs. 4 and 5 are side and end elevations, respectively, of the inlet branch of the dry-pipe with the throttle-valve and its operating mechanism. Fig. 6 is an enlarged top view of the throttle-valve detached, and Fig. 7 is a side view of same.

Similar letters of reference indicate corresponding parts.

A represents the boiler, provided with the usual steam-dome B, into which the vertical branch D of the dry-pipe C is extended for the purpose of obtaining the driest part of the steam.

To bring the inlet of the dry-pipe as high as possible above the water-line of the boiler the dry-pipe is terminated near the top of the dome B, and provided upon its end with a peripheral valve-seat, *s*. Upon this seat is fitted the main puppet-valve E, having downward-projecting radial guide-wings *e*, bearing against the inner side of the dry-pipe, and forming straight and direct steam-passages with the same and parallel with the axis thereof.

The main puppet-valve E is provided in its top with a central port, *r*, in the form of a tapering orifice, in which is fitted the supplemental valve F, consisting simply of a bolt or rod, *f*, having at one end a flaring head, *b*, which constitutes the valve for the port *r*. The opposite end of the bolt *f* passes through and is guided in a ring, *d*, embraced between the lower extremities of the guide-wings *e*, and is provided below said ring with an adjusting-nut, *n*, which determines the lift of the valve.

On a bracket, H, upon the upper end of the dry-pipe is pivoted a bell-crank lever, G, one end of which is connected with the supplemental valve F, and the other end with another lever, I, pivoted about midway to a bracket, K, on the exterior of the dry-pipe, these two levers, when united, forming a toggle-joint, whereby the greatest strength is combined with the greatest delicacy of movement. To the lower end of the lever I is connected a rod, L, that passes through a stuffing-box on the rear end of the boiler, and operated by the usual lever M at the outside.

I do not claim, broadly, the combination, with a valve, of an auxiliary valve acting in advance of the former and relieving the same of steam-pressure, as I am aware the same is not new; but What I do claim as new, and desire to secure by Letters Patent, is—

1. The combination and arrangement, with a steam-boiler, of a dry-pipe terminating vertically in the vicinity of the top of the steam-dome and provided on its extremity with a peripheral valve-seat, a main puppet-valve seated thereon and guided by the interior of the dry-pipe, and a supplemental puppet-valve seated upon the main valve and arranged central with the axis thereof, substantially as specified and shown.

2. The combination, with a main puppet-valve, of a supplemental puppet-valve seated upon the main valve and lifting the same by an adjustable nut or shoulder on the end of the stem of the supplemental valve protruding through the end of the stem of the main valve, substantially as set forth.

3. In combination with the main valve E, the auxiliary valve F, consisting of the rod *f*, provided at its upper end with the flaring head *b*, and at its lower end with the adjusting-nut *n*, substantially in the manner shown.

4. The combination of a toggle-jointed lever with a throttle-valve, when constructed and operating substantially as herein described.

In testimony whereof I have hereunto set my hand this 26th day of December, 1879.

HENRY WATKEYS.

Witnesses:

E. LAASS,

JOHN MORGAN.